United States Patent [19]

Stanek

[11] Patent Number: 4,958,412
[45] Date of Patent: Sep. 25, 1990

[54] METHOD AND APPARATUS FOR COATING A FOOD PRODUCT

[75] Inventor: Tom G. Stanek, Smyrna, Ga.

[73] Assignee: W. R. Grace & Co.-Conn., Duncan, S.C.

[21] Appl. No.: 282,794

[22] Filed: Dec. 9, 1988

[51] Int. Cl.⁵ ............................................. A22C 11/02
[52] U.S. Cl. .......................................... 17/41; 17/49; 17/1 R
[58] Field of Search ................ 17/42, 41, 35, 51, 1 R, 17/49; 53/567, 576

[56] References Cited

U.S. PATENT DOCUMENTS

| | | | |
|---|---|---|---|
| 3,473,190 | 10/1969 | Kielsmeier et al. | 17/35 |
| 4,512,059 | 4/1985 | Beckman | 17/41 |
| 4,599,764 | 7/1986 | Knepshield | 17/41 |
| 4,646,386 | 3/1987 | Dreisin | 17/35 |

FOREIGN PATENT DOCUMENTS

| | | | |
|---|---|---|---|
| 1148905 | 5/1963 | Fed. Rep. of Germany | 17/41 |
| 2601595 | 7/1976 | Fed. Rep. of Germany | 17/41 |

Primary Examiner—Willis Little
Attorney, Agent, or Firm—John J. Toney; William D. Lee, Jr.; Mark B. Quatt

[57] ABSTRACT

A sizing ring includes a cylindrical sleeve and optionally a frustoconical portion, in which a least one channel located within the sleeve provides for the transfer of liquid additive from a liquid source to the outer extremity of the sizing ring. Grooves in the outer face of the ring provide a means of transmitting the liquid additive from the ring onto the interior of the casing as it is unshirred. The liquid additive, such as liquid smoke or colorant, is then transferred to the exterior surface of the stuffed meat product.

15 Claims, 5 Drawing Sheets

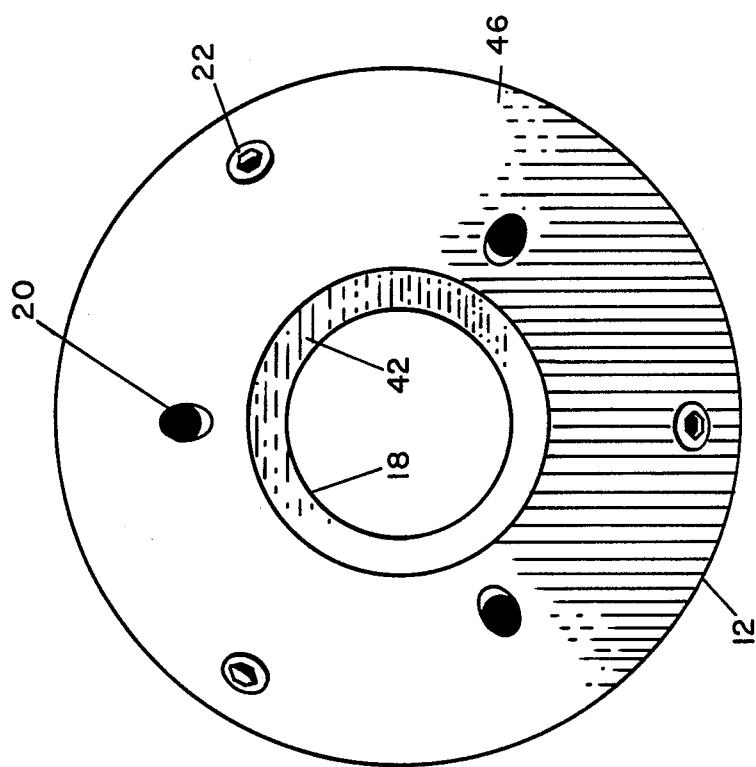
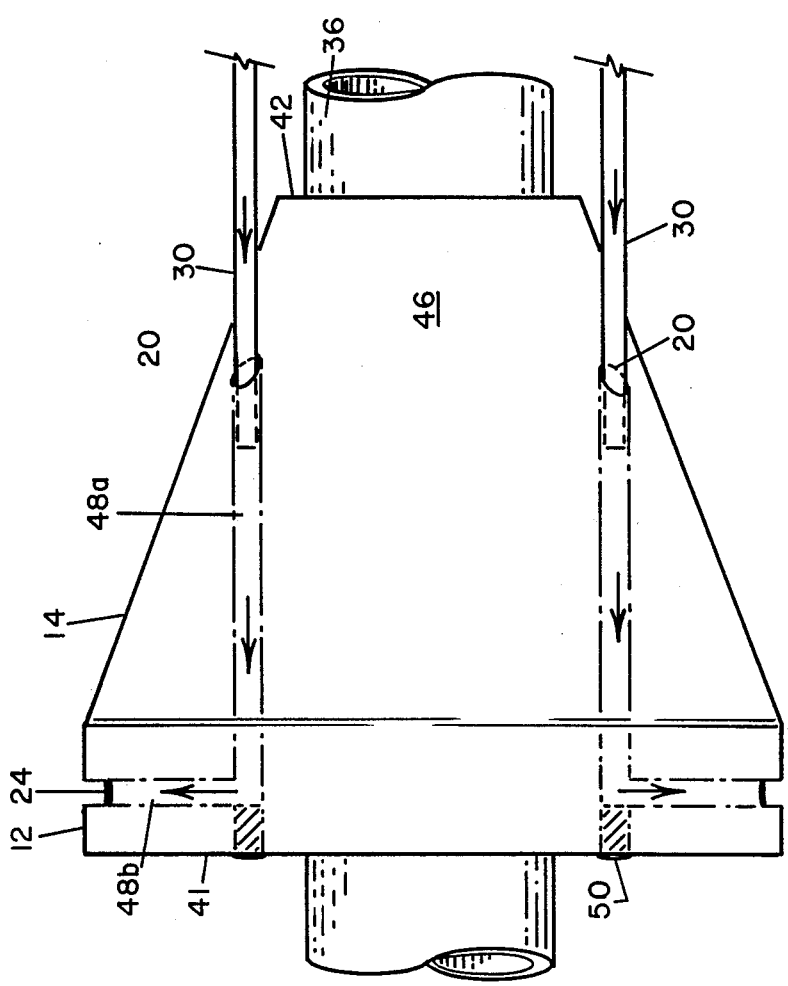

METHOD AND APPARATUS FOR COATING A FOOD PRODUCT

FIELD OF THE INVENTION

The present invention relates to a sizing ring, and more particularly to a sizing ring for casings in which liquid smoke or colorants may be introduced to the interior of a food casing.

BACKGROUND OF THE INVENTION

It is well known in the food packaging art to stuff synthetic or cellulosic tubular casings with various meat products. These products are typically processed and introduced into the casings in the form of an emulsion or comminuted form.

In automated processes, processed meat products are typically introduced into a shirred casing. This is a casing which is shirred to a much shorter length than the actual length of the casing. As the automated process is operated, the shirred casing is fed typically over a sizing ring which unshirres the casing before stuffing with the meat product. Of course, the diameter of the sizing ring will be predetermined in accordance with the size of the intended casing which will be used for the particular packaging operation.

It is also common practice to introduce liquid smoke, colorant, or other similar additives to certain processed meat products such as sausage or luncheon meats to impart the desired flavor or color to the food product. These additives are usually blended into the food product before the stuffing operation, or impregnated into the casing material itself if the composition of the casing permits impregnation of such additives.

This general practice requires an additional step prior to the stuffing operation. In the case of pre-blending the colorant or liquid smoke into the food product, sometimes more additive is used than is really required. For example, if only the surface of the food product requires the colorant or liquid smoke, pre-blending uses excess additive which is blended throughout the food product.

Additionally, in the case of some synthetic casings, liquid smoke and colorant are not easily added to the casing material itself, and if added are not readily retained by the casing material.

For these reasons, it is desirable to provide a method and apparatus for coating the exterior of a processed meat product, packaged in a casing, which does not require the pre-blending of the additive before the stuffing operation, or impregnation of the casing material itself with the additive.

SUMMARY OF THE INVENTION

In one aspect of the invention, in a sizing ring suitable for use with a tubular casing and a stuffing horn, the sizing ring comprising a cylindrical sleeve having an outer diameter substantially corresponding to the inside diameter of the casing, an inner diameter slightly greater than the outside diameter of the stuffing horn, and two parallel, lateral faces defining the lateral thickness of the sleeve, the improvement comprises at least one channel within the sleeve, the channel having a first end and a second end, the first end terminating in an orifice at one of the lateral faces of the sleeve, and an annular groove located at an outer extremity of the sleeve, in communication with the second end of the channel, and intermediate the lateral faces of the sleeve.

In another aspect of the invention, in a sizing ring suitable for use with a tubular casing and a stuffing horn, the sizing ring comprising a cylindrical sleeve portion having an outer diameter substantially corresponding to the inside diameter of the casing, an inner diameter slightly greater than the outside diameter of the stuffing horn, and parallel, lateral faces defining the lateral thickness of the cylindrical sleeve portion; the sizing ring further comprising a frustoconical portion having its greater outer diameter substantially corresponding to the inside diameter of the casing, an inner diameter slightly greater than the outside diameter of the stuffing horn, and its larger lateral face being a lateral face of the cylindrical portion, the improvement comprising at least one channel within the sleeve, the channel having a first end and a second end, the first end terminating in an orifice at an inclined surface of the frustoconical portion of the ring; and an annular groove located at an outer extremity of the cylindrical portion, in communication with the second end of the channel, and intermediate the lateral faces of the cylindrical portion of the ring.

In still another aspect of the present invention, a method of coating a food product with a liquid comprises the steps of delivering the liquid through a delivery means to the interior of a sizing ring, delivering the liquid from the interior of the sizing ring to an annular groove located at the outer extremity of the sizing ring, moving a tubular casing over the annular groove of the sizing ring such that liquid is transferred to the interior surface of the tubular casing, and stuffing the tubular casing with a food product such that liquid on the interior surface of the casing transfers to the food product.

In yet another aspect of the present invention, an apparatus for coating a food product with a liquid comprises a sizing ring comprising a cylindrical sleeve having an outer diameter substantially corresponding to the inside diameter of the casing, an inner diameter slightly greater than the outside diameter of the stuffing horn, two parallel, lateral faces defining the lateral thickness of the sleeve, at least one channel within the sleeve, the channel having a first end and a second end, the first end terminating in an orifice at one of the lateral faces of the sleeve, and an annular groove located at an outer extremity of the sleeve, in communication with the second end of the channel and intermediate the lateral faces of the sleeve; and a means for delivering the liquid from a source of the liquid through the cylindrical sleeve to the annular groove.

BRIEF DESCRIPTION OF THE DRAWINGS

The invention may be further understood by reference to the following figure drawings, given by way of illustration only:

FIG. 4 is a side view of a sizing ring in accordance with the present invention;

FIG. 5 is an end view of the sizing ring of FIG. 3 taken along line 5—5 of FIG. 3;

DESCRIPTION OF THE PREFERRED EMBODIMENTS

Figure 1:
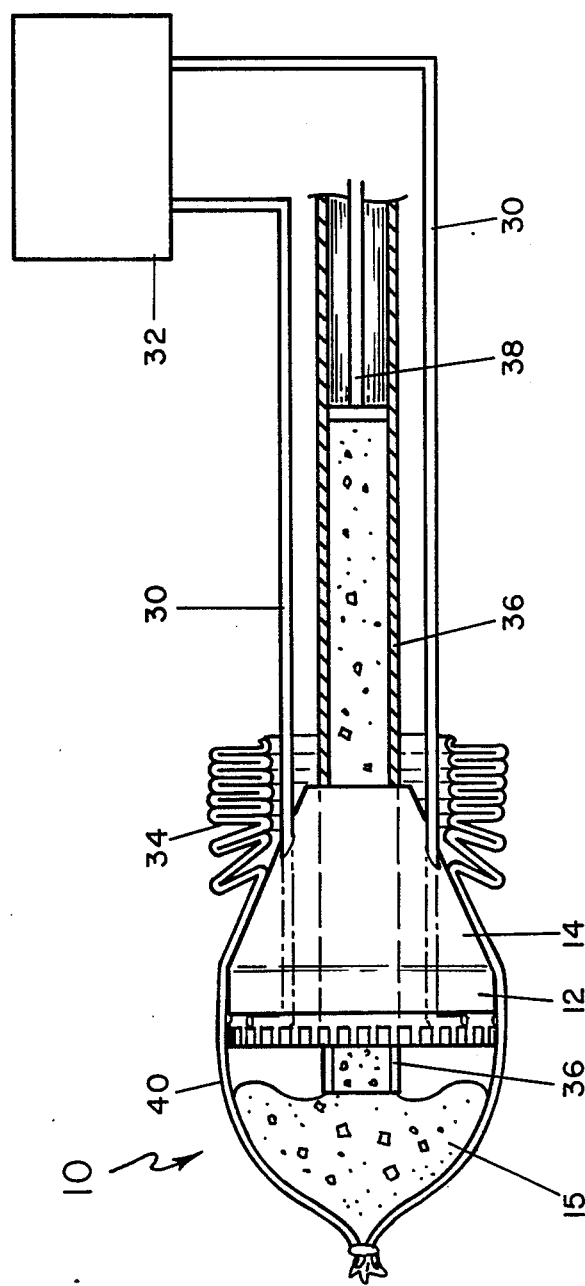
FIG. 1 is a schematic side view of the apparatus, sizing ring, and method of the present invention.

Referring to FIG. 1, an apparatus for coating a food product such as a meat emulsion with liquid smoke or colorant includes a sizing ring 10 having a cylindrical portion 12 and a frustoconical portion 14. A sizing ring of this general configuration has been commercially available from the Cryovac division of W. R. Grace & Co.-Conn.

Figure 3:
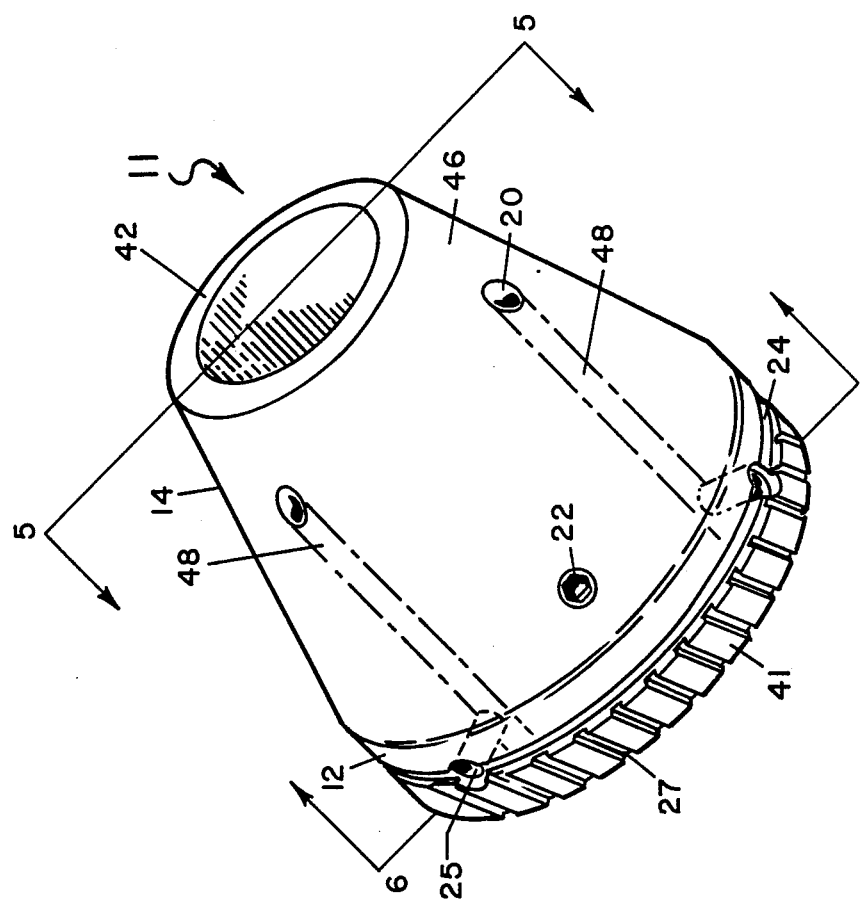
FIG. 3 is a perspective view of an alternate embodiment of a sizing ring in accordance with the present invention.
Figure 2:
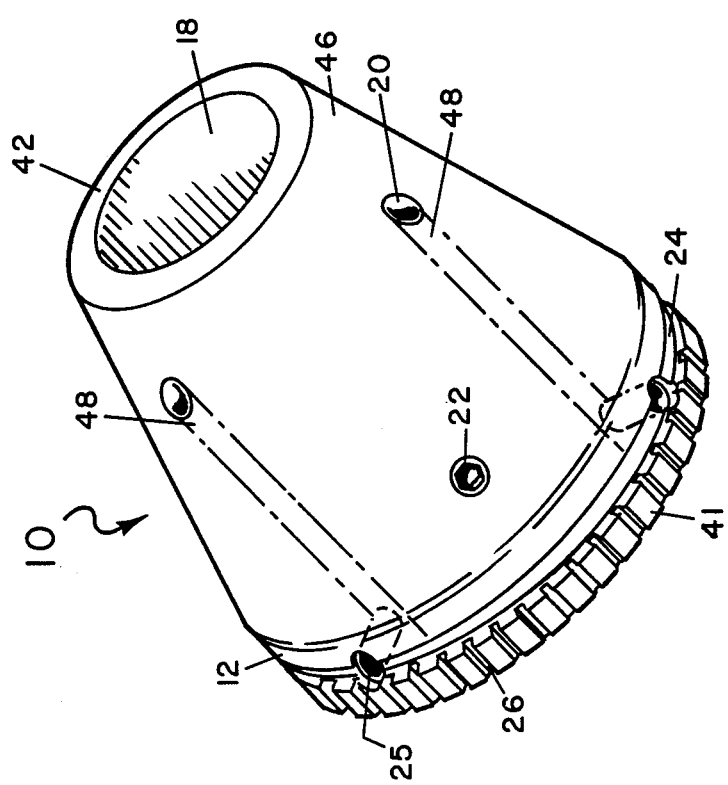
FIG. 2 is a perspective view of a sizing ring in accordance with the present invention.

The inventor has discovered that by introducing channels in the interior of the ring, as indicated in phantom lines in FIG. 1 and in more detail in FIGS. 2 and 3, the additives such as liquid smoke, colorant, or other materials may be passed through the sizing ring and onto an outer extremity of the ring. There, the unshirred casing 40, as it passes over the sizing ring, picks up the colorant or other material and deposits it on the interior side of casing 40. Some of this additive then transfers to the outer surface of the meat emulsion 15.

As seen in FIG. 1, the liquid source 32 supplies liquid smoke or other additives through tubing 30 to the sizing ring 10. The additive is then passed through one or more channels 48 and up into an outer extremity of the sizing ring at widened groove portion 25 (see FIGS. 2 and 3). The additive will then disperse around annular groove 24 and either perpendicular secondary grooves 26 or oblique secondary grooves 27 to facilitate the transfer of the additive from the sizing ring's exterior surface to the interior surface of the unshirred tubing 40 as it passes over the sizing ring 10.

At the same time, the meat emulsion or other food product 15 to be stuffed into the casing material is pushed forward by ram 38 and passes through the hollow core of the sizing ring as is typical in the art.

The shirred casing 34 itself is well known in the art, and various means have been devised to install sections of shirred casing onto stuffing horns, or alternatively onto a support sleeve which has in turn been installed on a stuffing horn. Those skilled in the art will readily recognize the adaptability of the present invention to various stuffing assemblies and apparatus.

Referring to FIGS. 2 and 3, detail of the sizing ring in accordance with the present invention is seen. Typically, one or a plurality of set screws 22 is used to initially install the sizing ring to the stuffing horn or a support sleeve.

The present invention will operate on the basis of a single tubing 30 delivering a liquid additive through a single orifice 20 of the sizing ring, through the interior and up into a widened groove portion 25 on the cylindrical extremity of the sizing ring as shown. From there, an annular groove 24 and secondary grooves 26 or 27 will help to uniformly distribute the liquid additive. It is preferable that a plurality of tubing 30, orifices 20, and widened groove portions 25 are utilized to better distribute the liquid additive. In the most preferred embodiment, three tubes 30, orifices 20, and matching elements described above are utilized, being distributed uniformly around the circumference of the sizing ring.

In the case of the preferred frustoconical sizing ring pictured in FIGS. 2 and 3, the orifices 20 will occur along the inclined surface 46 of the frustoconical segment 14 of sizing ring 10. The widened groove portion 25 and annular groove 24 may be of various cross-sectional dimension to facilitate distribution of the liquid additive around the circumference of the sizing ring. Various secondary grooves such as those depicted as 26 and 27 in the drawings help further in distributing the liquid additives uniformly over the interior of unshirred casing 40. The obliquely oriented secondary grooves 27 will produce less undesirable striations of the finished product than the perpendicularly oriented secondary grooves 26.

Channel 48 is indicated as having two segments, 48a and 48b. The first segment 48a provides ingress from orifice 20 to the interior of the sizing ring. The second segment 48b provides egress from the end of the first channel segment 48a up to the annular groove 24 on the outside extremity of the shoulder segment 12 of the sizing ring.

In manufacture, the channel segments 48a and 48b may be produced by boring a channel directly through the frustoconical portion of the sizing ring and, optionally, continuing out to first lateral face 41 of the sizing ring. The second channel segment 48b may be drilled or bored through the cylindrical portion 12 so as to intersect first channel segment 48. In this method, a cap 50 should be placed over the terminal end of channel segment 48a where it intersects first lateral face 41. This prevents the loss of liquid additive through the first face of the ring.

Figure 6:
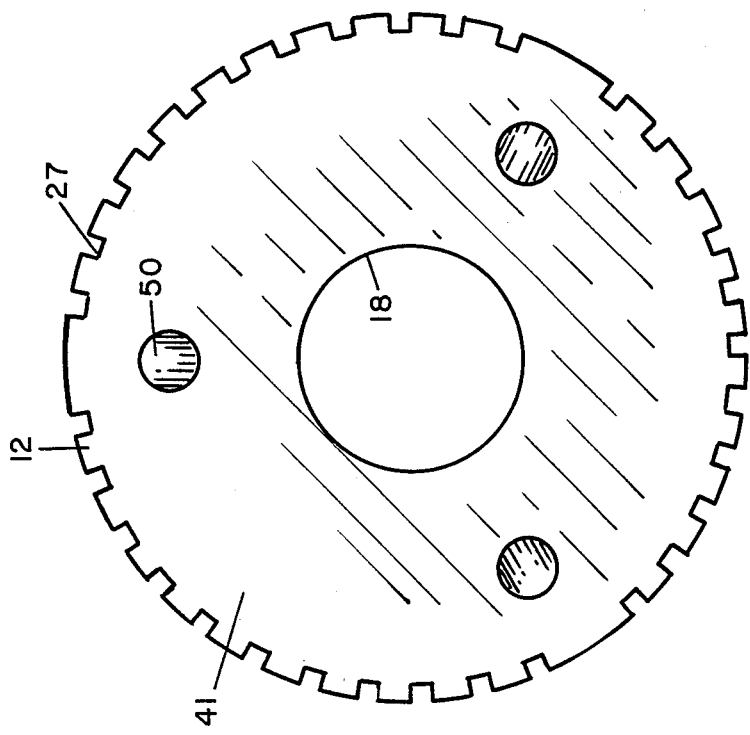
FIG. 6 is another end view of the sizing ring of FIG. 3 taken along line 6—6 of FIG. 3.

Alternative configurations for channels 48, including a single channel disposed in an inclined manner from orifice 20 to annular groove 24, may also be employed. In an alternative embodiment, in FIGS. 6, 7 and 8, a sizing ring in accordance with the present invention comprises a cylindrical sleeve with no frustoconical portion. In this event, tubing 30 is introduced through orifice 20 into the interior of the sizing ring, and first and second channel segments direct the liquid additive up into annular groove 24, analogous to the method and arrangement of the preferred embodiment.

Figure 7:
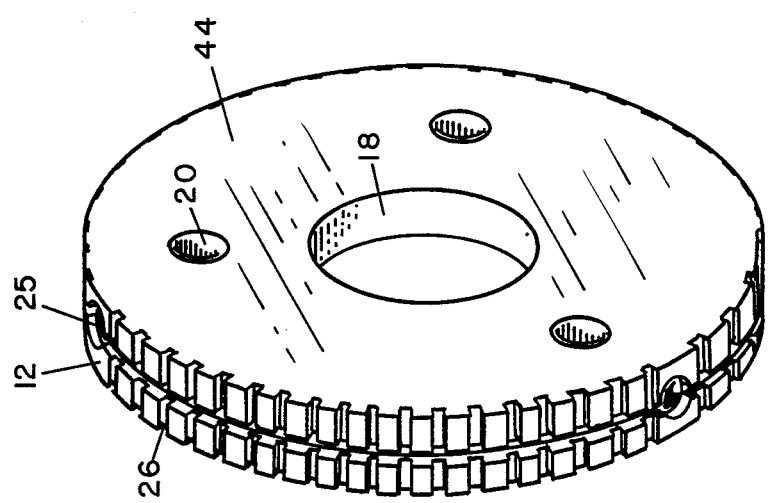
FIG. 7 is a perspective view of an alternate embodiment of the sizing ring in accordance with the present invention.
Figure 8:
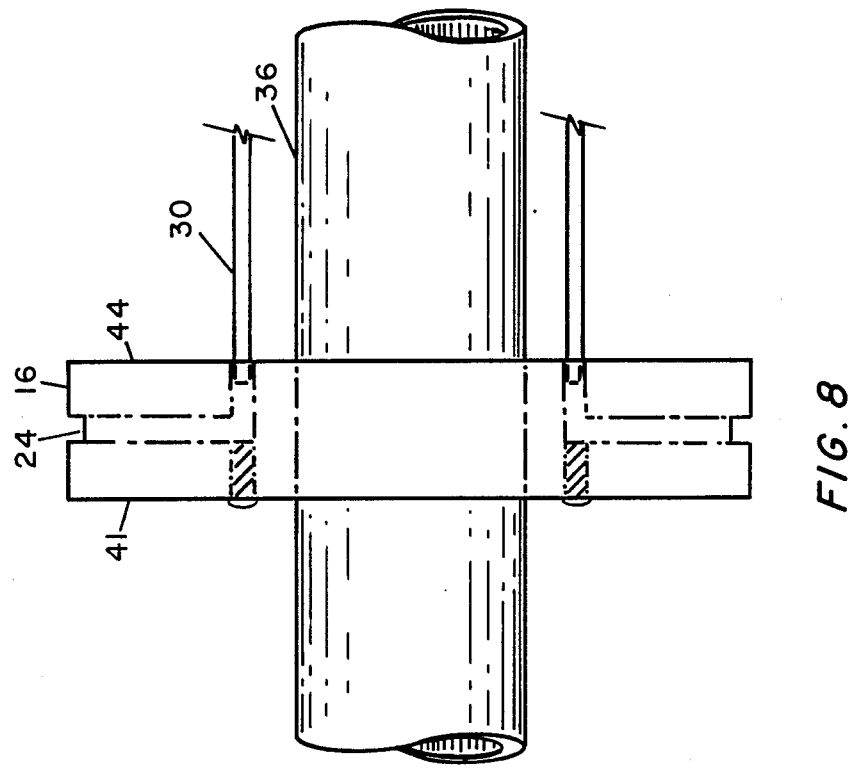
FIG. 8 is a side view of the sizing ring of FIG. 7.

It will be noted in FIG. 7 that the secondary grooves 26 (in this case perpendicular to the annular groove 24) extend in both directions from annular groove 24. Thus, the secondary grooves, whether perpendicular or oblique to the annular groove 24, may extend in one or both directions from the annular groove to extend to the edges of one or both faces 44 and 41 of the sizing ring. The same is true for the frustoconical ring of FIGS. 2 and 3.

Those skilled in the art will readily understand that other modifications including alternating secondary groove patterns in which the grooves extend alternately to a first face or a second face of the cylindrical sleeve or cylindrical portion may be utilized with varying success. The widened groove portion 25, while useful when the channel segments are bored or drilled into the sizing ring, may be eliminated if means are used to provide the channel segments and the annular groove 24 without the need for widened groove portions. Depending on the availability of space i.e. the width of the cylindrical sleeve portion of the preferred sizing ring, or of the cylindrical sleeve of the alternative ring, more than one annular groove can also be utilized. These and other modifications are therefore deemed to be within the spirit and scope of the claims as defined below.

What is claimed is:

1. In a sizing ring suitable for use with a tubular casing and a stuffing horn, the sizing ring comprising a cylindrical sleeve having (i) an outer diameter substantially corresponding to the inside diameter of the casing,
(ii) an inner diameter slightly greater than the outside diameter of the stuffing horn, and
(iii) two parallel, lateral faces defining the lateral thickness of the sleeve, the improvement comprising:
(a) at least one channel within the sleeve, said channel having a first end and a second end, the first end terminating in an orifice at one of the lateral faces of the sleeve; and
(b) an annular groove located at an outer extremity of the sleeve, in communication with the second end of the channel, and intermediate the lateral faces of the sleeve.

2. The improvement according to claim 1 wherein the channel within the sleeve comprises:
(a) a first channel portion which communicates with and extends from the orifice to the interior of the sleeve, and
(b) a second channel portion which communicates with and extends from the first channel portion in the interior of the sleeve, up to the annular groove.

3. The improvement according to claim 1 further comprising at least one substantially linear groove located at the outer extremity of the sleeve, in communication with the annular groove, and substantially parallel to the stuffing horn.

4. The improvement according to claim 3 wherein the linear groove extends to a lateral end of the sleeve.

5. The improvement according to claim 3 wherein the linear groove is oriented perpendicular to the annular groove.

6. The improvement according to claim 3 wherein the linear groove is oriented at an acute angle to the annular groove.

7. In a sizing ring suitable for use with a tubular casing and a stuffing horn, the sizing ring comprising a cylindrical portion having
(i) an outer diameter substantially corresponding to the inside diameter of the casing,
(ii) an inner diameter slightly greater than the outside diameter of the stuffing horn, and
(iii) parallel, lateral faces defining the lateral thickness of the cylindrical portion;
the sizing ring further comprising a frustoconical portion having
(i) its greater outer diameter substantially corresponding to the inside diameter of the casing,
(ii) an inner diameter slightly greater than the outside diameter of the stuffing horn, and
(iii) its larger lateral face being a lateral face of the cylindrical portion, the improvement comprising:
(a) at least one channel within the ring, said channel having a first end and a second end, the first end terminating in an orifice at an inclined surface of the frustoconical portion of the ring; and
(b) an annular groove located at an outer extremity of the cylindrical portion, in communication with the second end of the channel, and intermediate the lateral faces of the cylindrical portion of the ring.

8. The improvement according to claim 7 wherein the channel within the sleeve comprises:
(a) a first channel portion which communicates with and extends from the orifice to the interior of the cylindrical portion of the sleeve, and
(b) a second channel portion which communicates with and extends from the first channel portion in the interior of the cylindrical portion, up to the annular groove.

9. The improvement according to claim 7 further comprising at least one substantially linear groove located at the outer extremity of the cylindrical portion, in communication with the annular groove, and substantially parallel to the stuffing horn.

10. The improvement according to claim 9 wherein the linear groove extends to a lateral end of the cylindrical 11. The improvement according to claim 9 wherein the linear groove is oriented perpendicular to the annular groove.

12. The improvement according to claim 9 wherein the linear groove is oriented at an acute angle to the annular 13. An apparatus for coating a food product with a liquid comprising:
(a) a sizing ring comprising a cylindrical sleeve having
(i) an outer diameter substantially corresponding to the inside diameter of the casing,
(ii) an inner diameter slightly greater than the outside diameter of the stuffing horn,
(iii) two parallel, lateral faces defining the lateral thickness of the sleeve,
(iv) at least one channel within the sleeve, said channel having a first end and a second end, the first end terminating in an orifice at one of the lateral faces of the sleeve; and
(v) an annular groove located at an outer extremity of the sleeve, in communication with the second end of the channel and intermediate the lateral faces of the sleeve; and
(b) A means for delivering the liquid from a source of the liquid through the cylindrical sleeve to the annular groove.

14. The improvement according to claim 13 wherein the means for delivering the liquid is a first tube member which communicates with and extends from a source of the liquid to the interior of the cylindrical sleeve.

15. An apparatus for coating a food product with a liquid comprising:
(a) A sizing ring comprising a cylindrical portion having
(i) an outer diameter substantially corresponding to the inside diameter of the casing,
(ii) an inner diameter slightly greater than the outside diameter of the stuffing horn, and
(iii) parallel, lateral faces defining the lateral thickness of the cylindrical sleeve portion;
the sizing ring further comprising a frustoconical portion having
(i) its greater outer diameter substantially corresponding to the inside diameter of the casing,
(ii) an inner diameter slightly greater than the outside diameter of the stuffing horn, and
(iii) its larger lateral face being a lateral face of the cylindrical portion; and
(b) a means for delivering the liquid from a source of the liquid, through the frustoconical portion of the ring, to the annular groove.

* * * * *

UNITED STATES PATENT AND TRADEMARK OFFICE
CERTIFICATE OF CORRECTION

PATENT NO. : 4,958,412

DATED : 9-25-90

INVENTOR(S) : Tom G. Stanek

It is certified that error appears in the above-identified patent and that said Letters Patent is hereby corrected as shown below:

In column 6, line 15, after "cal" add --portion--

In column 6, line 21, after "annular" add --groove--

Signed and Sealed this

Tenth Day of December, 1991

Attest:

HARRY F. MANBECK, JR.

*Attesting Officer*     *Commissioner of Patents and Trademarks*